United States Patent
Sargent et al.

(10) Patent No.: US 11,801,405 B2
(45) Date of Patent: Oct. 31, 2023

(54) SQUARE-SHAPED MOUNTING DEVICE

(71) Applicant: Rooftop Anchor, Inc., Heber City, UT (US)

(72) Inventors: Nathan Colton Sargent, Heber City, UT (US); Rowdy Hans DeJong, Heber City, UT (US); Braxton Tyler Schindler, Heber City, UT (US); Kynan Dee Wynne, Heber City, UT (US); John David Whittington, Heber City, UT (US); Reese James Ferrin, Wanship, UT (US); Joshua Paul Adam, Heber City, UT (US)

(73) Assignee: Rooftop Anchor, Inc., Heber City, UT (US)

( * ) Notice: Subject to any disclaimer, the term of this patent is extended or adjusted under 35 U.S.C. 154(b) by 0 days.

(21) Appl. No.: 17/473,535

(22) Filed: Sep. 13, 2021

(65) Prior Publication Data

US 2022/0228704 A1 Jul. 21, 2022

Related U.S. Application Data (60) Provisional application No. 63/139,953, filed on Jan. 21, 2021.

(51) Int. Cl.
*A62B 35/00* (2006.01)
*E04G 21/32* (2006.01)
*F16M 13/02* (2006.01)

(52) U.S. Cl.
CPC ...... *A62B 35/0068* (2013.01); *E04G 21/3214* (2013.01); *E04G 21/3219* (2013.01); *E04G 21/3276* (2013.01); *F16M 13/02* (2013.01)

(58) Field of Classification Search
CPC .. E04G 21/3276; A62B 35/0068; F16M 13/02
See application file for complete search history.

(56) References Cited

U.S. PATENT DOCUMENTS

| | | | | |
|---|---|---|---|---|
| 4,467,581 A | * | 8/1984 | Francovitch | E04D 5/143 52/410 |
| 4,480,819 A | * | 11/1984 | Lopez | E04G 21/3233 182/113 |
| 5,320,193 A | * | 6/1994 | Bongiovanni | E04G 21/3276 248/237 |
| 5,346,036 A | * | 9/1994 | Arisman | E04G 5/041 248/200.1 |

(Continued)

FOREIGN PATENT DOCUMENTS

| | | | | |
|---|---|---|---|---|
| DE | 102011078114 A1 | * | 4/2012 | ......... A62B 35/0068 |
| DE | 102020118602 A1 | * | 2/2021 | |

(Continued)

*Primary Examiner* — Eret C McNichols
(74) *Attorney, Agent, or Firm* — Renner, Otto, Boisselle & Sklar, LLP (57) ABSTRACT

A mounting device includes a first arm, a second arm positioned parallel to the first arm, and a top plate coupled to the first arm and the second arm. The top plate includes a center portion, a first coupling panel formed at a 90 degree angle with respect to a surface of the center portion, and a second coupling panel formed at a 90 degree angle with respect to a surface of the center portion. The second coupling panel is located at a side of the center portion opposite the first coupling panel.

11 Claims, 8 Drawing Sheets

(56) References Cited

U.S. PATENT DOCUMENTS

| | | | | |
|---|---|---|---|---|
| 5,711,397 A | * | 1/1998 | Flora | E04G 21/3242 248/228.3 |
| 6,227,329 B1 | * | 5/2001 | Ador | A62B 35/0056 182/36 |
| 7,163,083 B2 | * | 1/2007 | Argoud | E04G 21/3261 248/237 |
| 7,207,414 B2 | * | 4/2007 | Luke | A62B 35/04 182/45 |
| 7,240,770 B2 | * | 7/2007 | Mullins | E04G 21/3276 52/24 |
| 7,654,501 B2 | * | 2/2010 | Matthews | E04H 6/426 116/28 R |
| D658,975 S | * | 5/2012 | Cordova | E04D 5/143 D8/367 |
| 8,733,718 B2 | * | 5/2014 | Corsi | E04B 1/40 52/27 |
| 9,200,467 B2 | * | 12/2015 | Williams | E01F 9/692 |
| 9,643,035 B2 | * | 5/2017 | Mastenbroek | A62B 35/0056 |
| 9,878,187 B2 | * | 1/2018 | Sargent | E04G 21/328 |
| 10,053,878 B2 | * | 8/2018 | Allen | A62B 35/0068 |
| 10,898,741 B2 | * | 1/2021 | Giroux | A62B 35/0068 |
| 11,078,676 B2 | * | 8/2021 | Saygivar | A62B 35/0068 |
| 11,083,917 B2 | * | 8/2021 | Saygivar | E04G 21/3204 |
| 11,118,363 B1 | * | 9/2021 | Allen | E04G 21/3219 |
| 11,306,490 B1 | * | 4/2022 | Blow | E04G 3/265 |
| 2003/0182893 A1 | * | 10/2003 | Poldmaa | E04G 5/041 52/749.12 |
| 2006/0219478 A1 | * | 10/2006 | Severs | E04G 21/3276 182/2.9 |
| 2007/0144830 A1 | * | 6/2007 | Mastenbroek | A62B 35/0068 182/3 |
| 2010/0243837 A1 | * | 9/2010 | Cox | E04G 21/329 248/237 |
| 2015/0107184 A1 | * | 4/2015 | Nichols, Jr. | E04G 21/3276 52/698 |
| 2016/0059054 A1 | * | 3/2016 | Csizmadia | E04G 21/328 248/548 |
| 2017/0157438 A1 | * | 6/2017 | Sargent | E04G 21/328 |
| 2018/0016801 A1 | * | 1/2018 | Davis | E04H 17/00 |
| 2022/0112734 A1 | * | 4/2022 | Meinhold | E04G 21/3276 |
| 2022/0228386 A1 | | 7/2022 | Sargent et al. | |
| 2022/0228387 A1 | * | 7/2022 | Sargent | A62B 35/0068 |
| 2022/0228388 A1 | | 7/2022 | Sargent et al. | |
| 2022/0228704 A1 | * | 7/2022 | Sargent | A62B 35/0068 |

FOREIGN PATENT DOCUMENTS

| | | | | |
|---|---|---|---|---|
| FR | 2832751 A1 | * | 5/2003 | A62B 35/0068 |
| GB | 2567500 A | * | 4/2019 | A62B 35/0043 |
| JP | 2000045536 A | * | 2/2000 | A62B 1/04 |

* cited by examiner

SQUARE-SHAPED MOUNTING DEVICE

RELATED APPLICATIONS

The present application claims benefit under 35 U.S.C. § 119(e) of U.S. Provisional Application No. 63/139,953, filed Jan. 21, 2021. This application is herein incorporated by reference in its entirety.

TECHNICAL FIELD

The present disclosure relates generally to rooftop anchoring devices. Specifically, the present disclosure relates to systems and methods for surface coupling devices incorporating a number of arm members to distribute a load across a surface and a number of sealing devices to seal any apertures defined in the surface created by fasteners used to fasten the rooftop anchoring devices to the surface.

BACKGROUND

People working on the tops and sides of buildings, as well as other high structures, risk falling and suffering injury as a result. In modern society, building construction and building maintenance are areas that continue to expose workers to the risk of dangerous falls. According to the U.S. Department of Labor, work related falls are among the most common sources of work related severe injuries and death. (See, e.g., https://www.osha.gov/SLTC/fallprotection/). The Department of Labor's Bureau of Labor Statistics reports that slips, trips and falls resulted in approximately 229,000 injuries per year (2011-2013) resulting in approximately 700 workplace deaths per year. Death from falls is second only to vehicle related deaths and account for roughly 16% of work related deaths. Occupational Safety and Health Administration (OSHA) and American National Standards Institute (ANSI) 1-14 provide standards to reduce the number and severity of workplace falls. Fall protection equipment must, perform under a wide variety of conditions while not hindering the ability of the workers to safely perform their jobs.

In addition, workers who are tasked with working on a roof of a building or even suspending from the roof of a building require certified tie-off points to connect their rigging. These points are regulated by OSHA in the 1910.27 standard and other regulations and are required to support a minimum 5,000 lbs. load. These tie-off points, which may be referred to as "anchorage points" in the industry, must be designed, built, and installed under the direction of a qualified person or a professional engineer. These anchorage points are often used interchangeably for suspension rigging and as a connection for fall protection equipment.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION

Fall protection devices are devices that assist in protecting users from falling off structures such as buildings. These fall protection devices seek to prevent a fall from structures by securing the user to anchors coupled to the structure such as the roof. These devices are often required and regulated by OSHA that function under a number of laws and regulations such as Title 29 of the Code of Federal Regulations. Further, industries standards may be provided by private, non-profit organizations such as the ANSI. For example, guidance and testing parameters for fall protection and fall arrest devices are provided by the ANSI Z-359 Fall Protection Code.

OSHA is concerned with the safety, health, and welfare of people engaged in work or employment. The goals of occupational health and safety programs include fostering a safe and healthy work environment. OSHA may also protect co-workers, family members, employers, customers, and many others who might be affected by the workplace environment. Thus, OSHA seeks to protect any individual who may use devices such as a stanchion that provides a secure tie down while accessing a rooftop area, for example. Due to the distances that may separate the roof of a structure from a ground floor or other elevation below the roof, an individual accessing the roof area may be in significant danger as to loss of life or limb if a fall should occur. Thus, a fall protection system that secures an individual while accessing the roof of the structure significantly reduces or eliminates any death or injuries that may otherwise be experienced during such activities.

Examples described herein provide a system including a mounting device onto which a user may secure themselves from a fall. The mounting device includes a multitude of arms to provide additional stability. Further, the arms allow the mounting device to be coupled to a surface such as a roof surface in a plurality of points along the surface of the roof resulting in the mount being coupled more securely to the roof. Still further, the mounting device may be coupled to any portion of a roof structure irrespective of the location of trusses or joists into which the mounting device may be coupled. Thus, the mounting device may be coupled to either underlying anchoring structures such as, for example, the trusses or joists, or may be coupled to the deck of a surface (e.g., the roof surface) without anchoring into the underlying anchoring structures.

In one example, the arms may be coupled to the roof surface directly. In one example, the arms may be coupled to the roof surface indirectly via a number of bases or base plates. The bases may include sealable or self-sealing membranes that cover fasteners and holes formed in the surface of the roof. The fasteners used to directly or indirectly couple the mounting device to the roof surface may be coupled to any portion of the roof surface irrespective of whether the fasteners couple to underlying structures within the roof such as any truss or joist. Thus, in this manner, the mounting device may be coupled at any position along the roof surface while still providing a necessary load rating that may secure a user to the roof. In one example, the load rating of the mounting device may be approximately 5,000 pounds.

Examples described herein provide a mounting device. The mounting device includes a first arm, a second arm positioned parallel to the first arm, and a top plate coupled to the first arm and the second arm. The top plate includes a center portion, a first coupling panel formed at a 90 degree angle with respect to a surface of the center portion, and a second coupling panel formed at a 90 degree angle with respect to a surface of the center portion. The second coupling panel is located at a side of the center portion opposite the first coupling panel.

The first coupling panel couples to the first arm, and the second coupling panel couples to the second arm. The top plate secures the first arm to the second arm via the first coupling panel and the second coupling panel.

The mounting device further includes at least one base plate coupled to at least an end of the first arm or the second arm. The at least one base plate includes four base plates, and a first base plate is coupled to a first end of the first arm, a second based plate is coupled to a second end of the first arm, a third based plate is coupled to a first end of the second arm, and a fourth based plate is coupled to a second end of the second arm.

The at least one base plate includes a substrate to couple the mounting device to a structure via a number of structure fasteners, a coupling device extending at a 90 degree angle relative to a surface of the substrate, a first seal coupled to a top surface of the substrate, the first seal including an aperture through which the coupling device extends, and a second seal coupled to a bottom surface of the substrate and an including an aperture through which the coupling device extends. The second seal seals the coupling device, and the first seal seals the number of structure fasteners and the surface of the structure. The first seal and the second seal may be made of a polymer. The first seal and the second seal are sealed from an environment.

The mounting device further includes a bolt extending through a first aperture defined in the top plate. The mounting device further includes a tether coupled to the bolt. The mounting device further includes a first return extending from the top plate between the first coupling panel and the second coupling panel on a second side of the top plate. Further a second return extends from the top plate between the first coupling panel and the second coupling panel on a third side of the top plate.

Examples described herein also provide an apparatus includes a first arm, a second arm positioned parallel to the first arm, and a top plate coupled to the first arm and the second arm. The top plate includes a center portion, a first coupling panel formed at a 90 degree angle with respect to a surface of the center portion, and a second coupling panel formed at a 90 degree angle with respect to a surface of the center portion, the second coupling panel being located at a side of the center portion opposite the first coupling panel.

The first coupling panel couples to the first arm, and the second coupling panel couples to the second arm. The top plate secures the first arm to the second arm via the first coupling panel and the second coupling panel.

The apparatus further includes at least one base plate coupled to at least an end of the first arm or the second arm. The at least one base plate includes four base plates with a first base plate is coupled to a first end of the first arm, a second based plate is coupled to a second end of the first arm, a third based plate is coupled to a first end of the second arm, and a fourth based plate is coupled to a second end of the second arm. The at least one base plate includes a substrate to couple the mounting device to a structure via a number of structure fasteners, and a coupling device extending at a 90 degree angle relative to a surface of the substrate. A first seal coupled to a top surface of the substrate includes a first aperture through which the coupling device extends, and a second seal coupled to a bottom surface of the substrate includes a second aperture through which the coupling device extends. The first seal seals the number of structure fasteners and the surface of the structure, and the second seal seals the coupling device. The first seal and the second seal are made of a polymer, and the first seal and the second seal are sealed from an environment.

The apparatus further includes a bolt extending through a first aperture defined in the top plate. The apparatus further includes a tether coupled to the bolt. The apparatus further includes a first return extending from the top plate between the first coupling panel and the second coupling panel on a second side of the top plate, and a second return extending from the top plate between the first coupling panel and the second coupling panel on a third side of the top plate.

In the description herein, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described but may not be included in other examples.

Example Embodiments

Turning now to the figures, FIGS. 1 through 8 depict and describe a mounting device 100. The mounting device 100 includes a first arm 114-1 and a second arm 114-2. The first arm 114-1 and the second arm 114-2 are coupled to one another via a top plate 102. The first arm 114-1, when coupled via the top plate 102, are co-located along the same elevation. The top plate 102 is coupled to the first arm 114-1 and the second arm 114-2 such that the top plate 102 secures the first arm 114-1 and the second arm 114-2 together as well as to the top plate 102. The mounting device 100 further includes at least one base plate 120-1, 120-2, 120-3, 120-4 (collectively referred to as "base plate(s) 120") coupled to at least an end of the first arm 114-1 or the second arm 114-2. The ends of the first arm 114-1 and the second arm 114-2 may be angled at approximately 60°. By providing an angle to the ends of the first arm 114-1 and the second arm 114-2, a user such as an installer of the mounting device 100 may access portions of the mounting device 100 where the first arm 114-1 or the second arm 114-2 connect to the base plates 120. As depicted in FIGS. 1 through 6, four base plates are coupled to the mounting device 100 including a first base plate coupled to a first end of the first arm, a second based plate coupled to a second end of the first arm, a third based plate coupled to a first end of the second arm, and a fourth based plate coupled to a second end of the second arm.

In one example, the first arm 114-1 and/or the second arm 114-2 may be coupled to a roof surface or other surface directly. In one example, the first arm 114-1 and/or the second arm 114-2 may be coupled to the roof surface indirectly via a number of the base plates 120. The base plates 120 may include a number of seals to seal portions of the base plates 120 from the environment in which the mounting device 100 is deployed. The environment may include any type of weather including precipitation, wind, contaminating dirt, solar heat, etc.

An anchor 118 may be coupled to the top plate 102 at, for example, a center portion 104 of the top plate 102 such as in a direct center of the center portion 104. A top plate aperture 202 may be defined in the top plate 102 to allow for a tether fastener 126 to extend through the top plate 102 and a mounting portion of the anchor 118 to secure the anchor 118 to the top plate 102. The anchor 118 may be any device capable of providing an anchor to which ropes, cables and other fall protection equipment may be coupled. In one example, the anchor 118 may include a MEGA swivel anchor developed and distributed by ClimbTech. However, any device including a loop capable of providing an anchor to which ropes, cables and other fall protection equipment may be coupled may be utilized.

The top plate 102, the first arm 114-1, and the second arm 114-2 may be made of any rigid material that may withstand loads placed thereon if and when an individual tethered to the mounting device 100 falls from the structure or otherwise places a load on the mounting device 100. In one example, the top plate 102, the first arm 114-1, and the second arm 114-2 may be made of a metal, metal alloys, a coated metal, coated metal alloys, composite materials, and other rigid, load-bearing materials.

Figure 1:
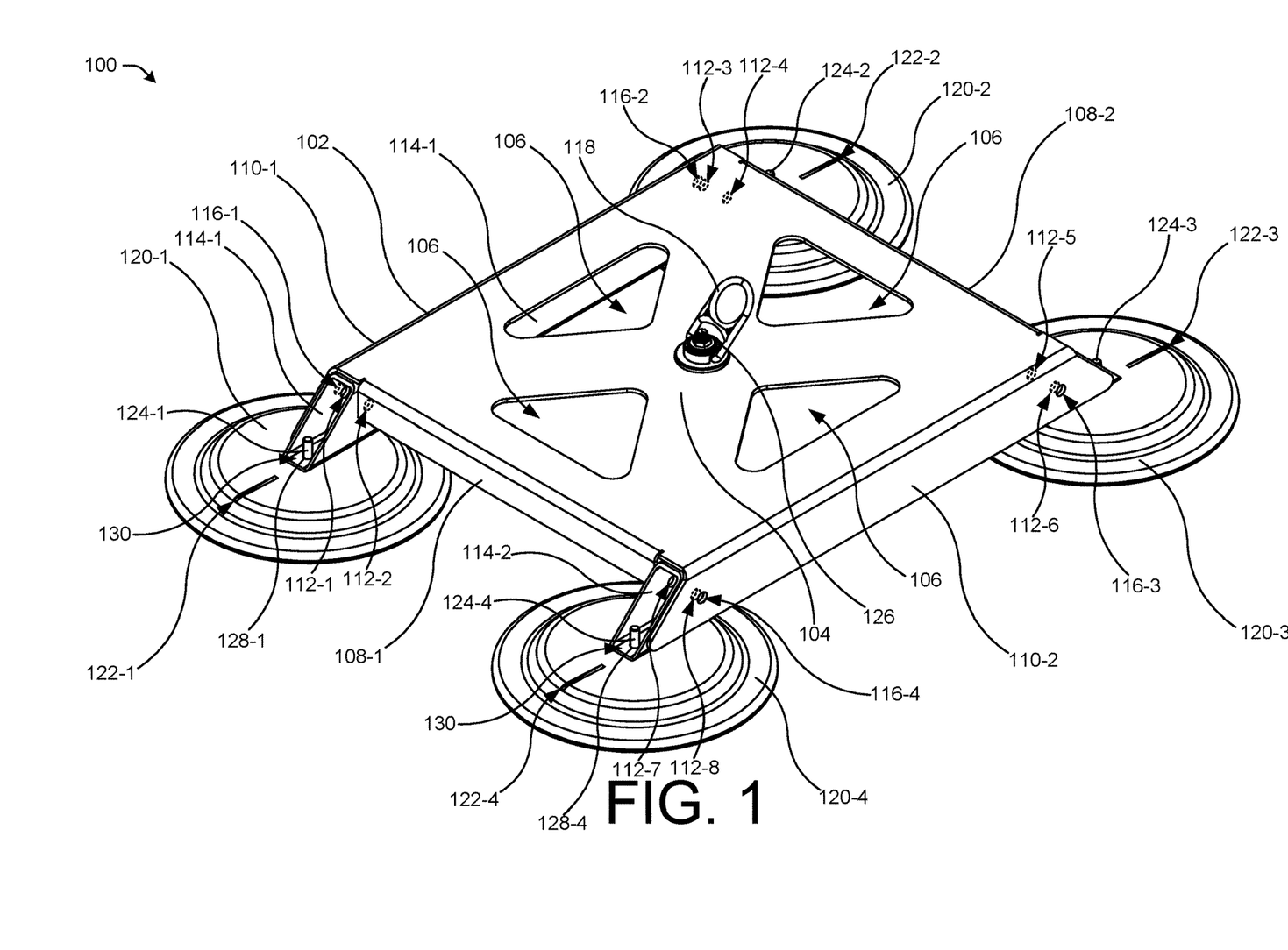
FIG. 1 illustrates a top isometric view of a mounting device, according to an example of the principles described herein.
Figure 2:
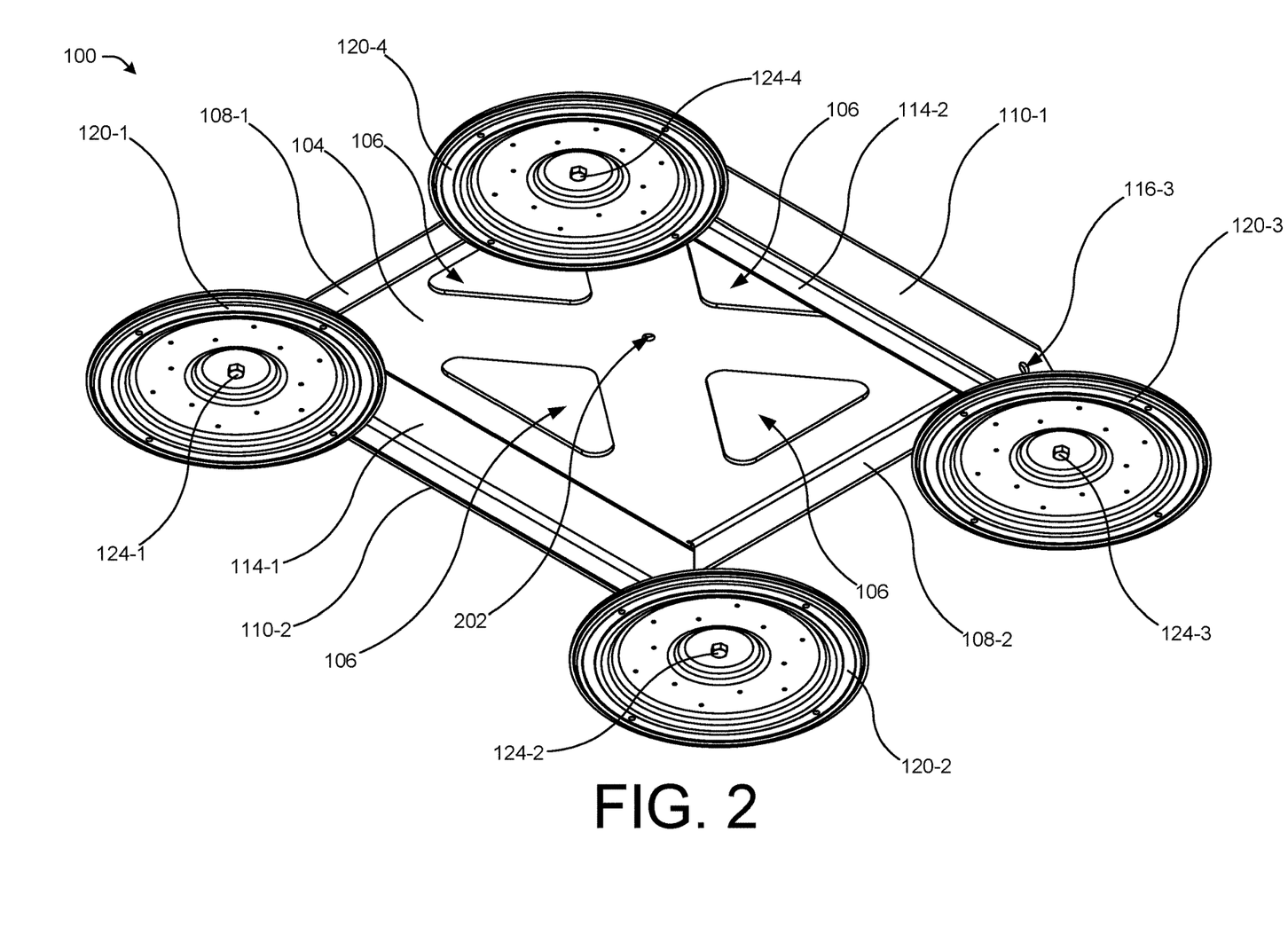
FIG. 2 illustrates a bottom isometric view of the mounting device of FIG. 1, according to an example of the principles described herein.
Figure 3:
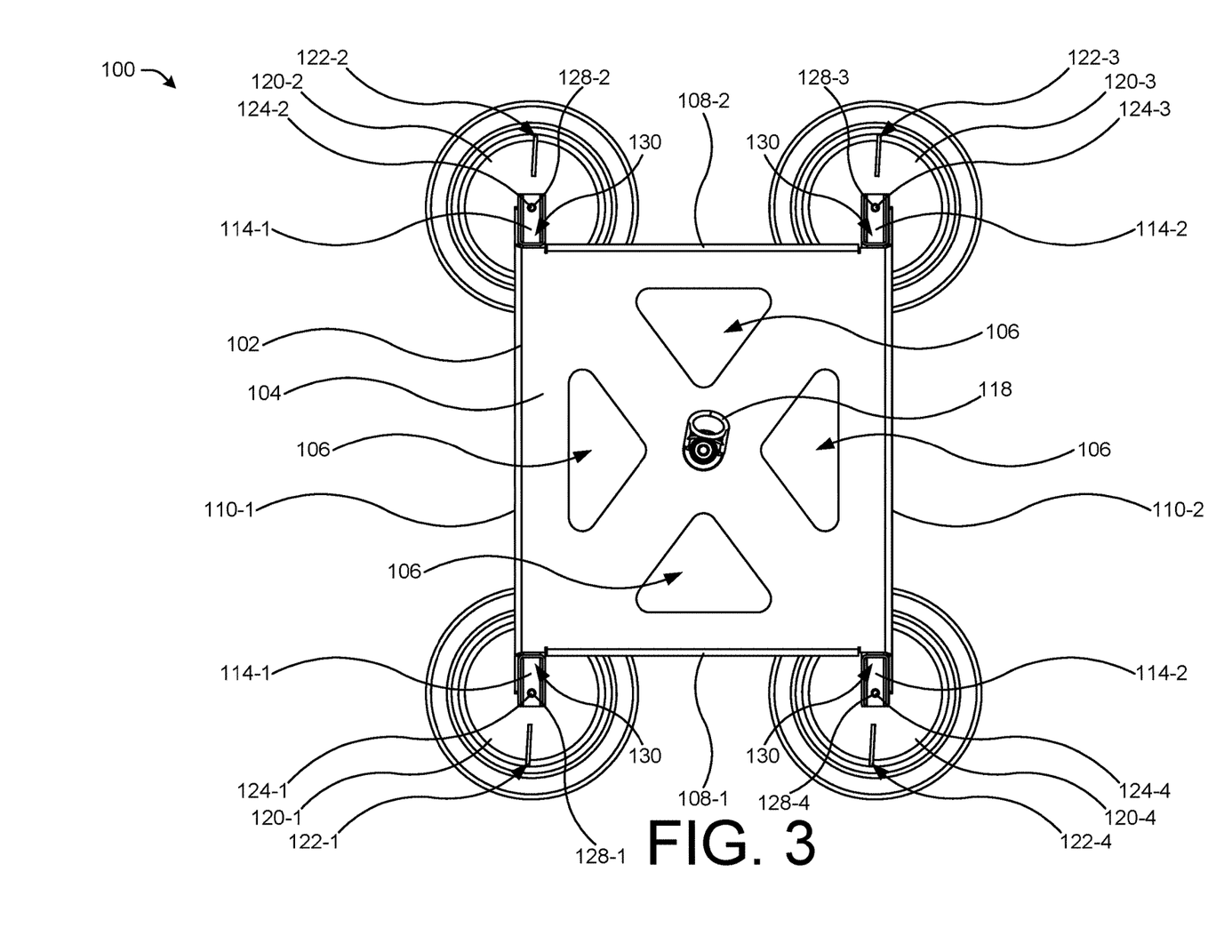
FIG. 3 illustrates a top plan view of the mounting device of FIG. 1, according to an example of the principles described herein.
Figure 4:
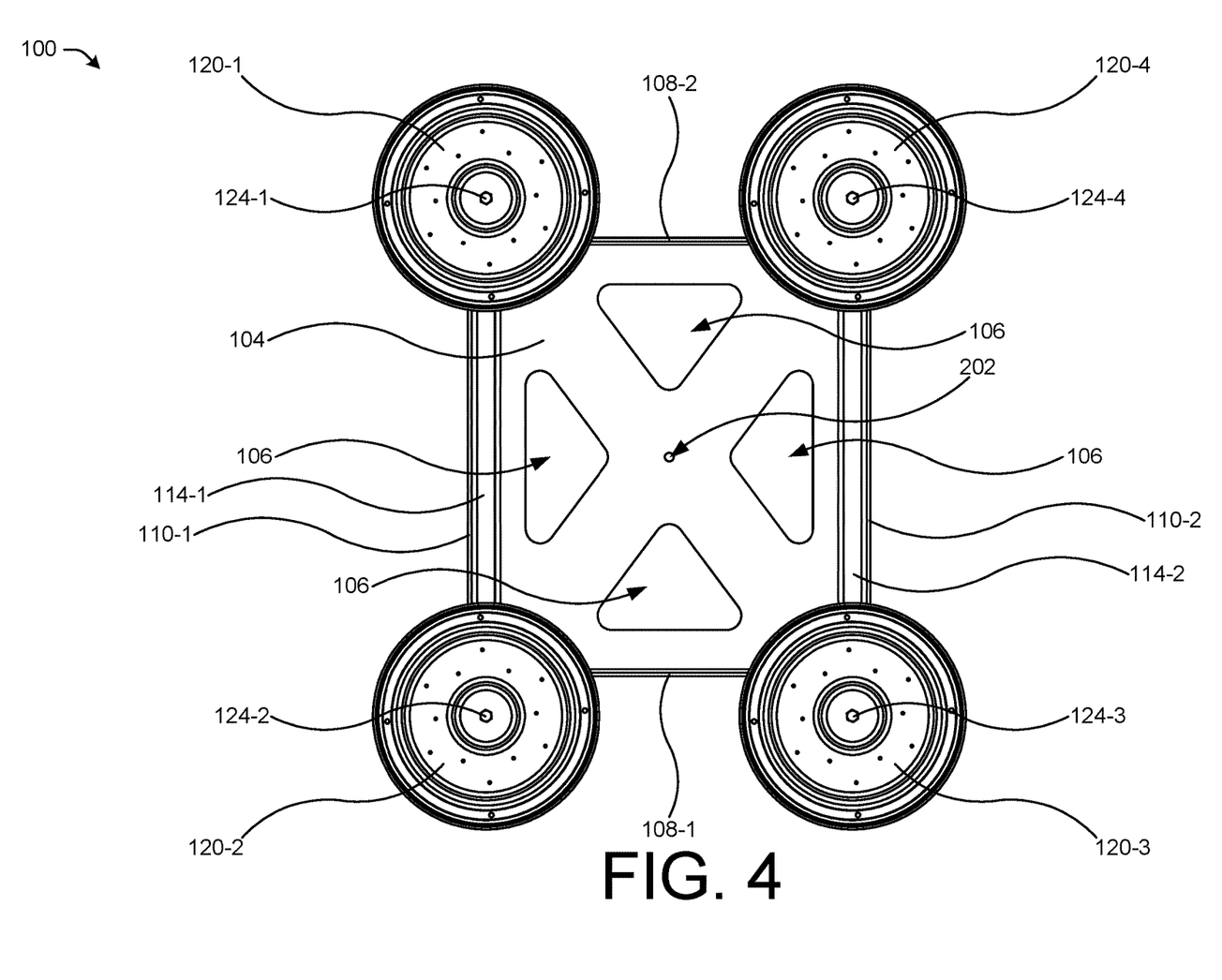
FIG. 4 illustrates a bottom plan view of the mounting device of FIG. 1, according to an example of the principles described herein.
Figure 5:
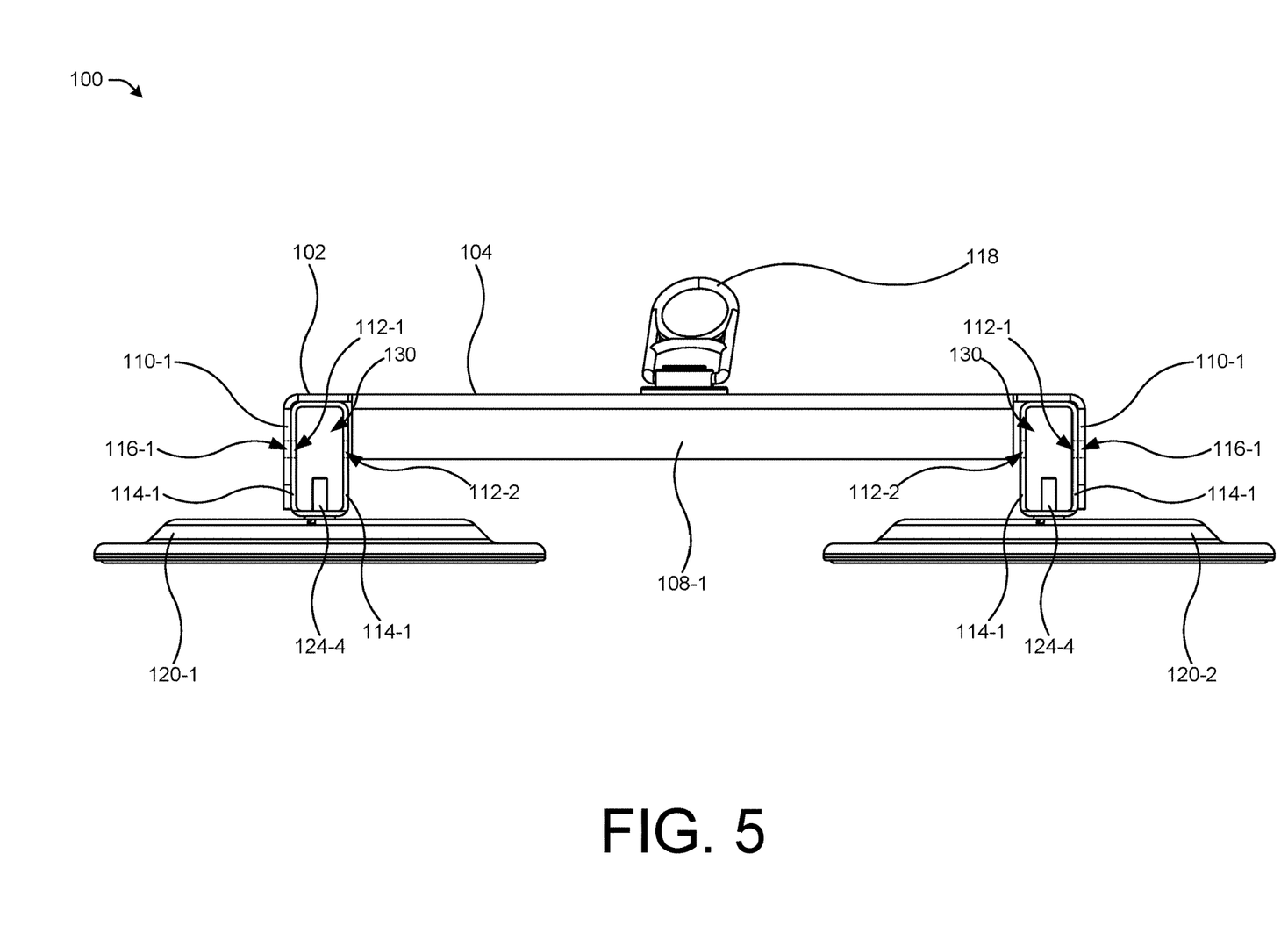
FIG. 5 illustrates a first side view of the top plate of the mounting device of FIG. 1, according to an example of the principles described herein.
Figure 6:
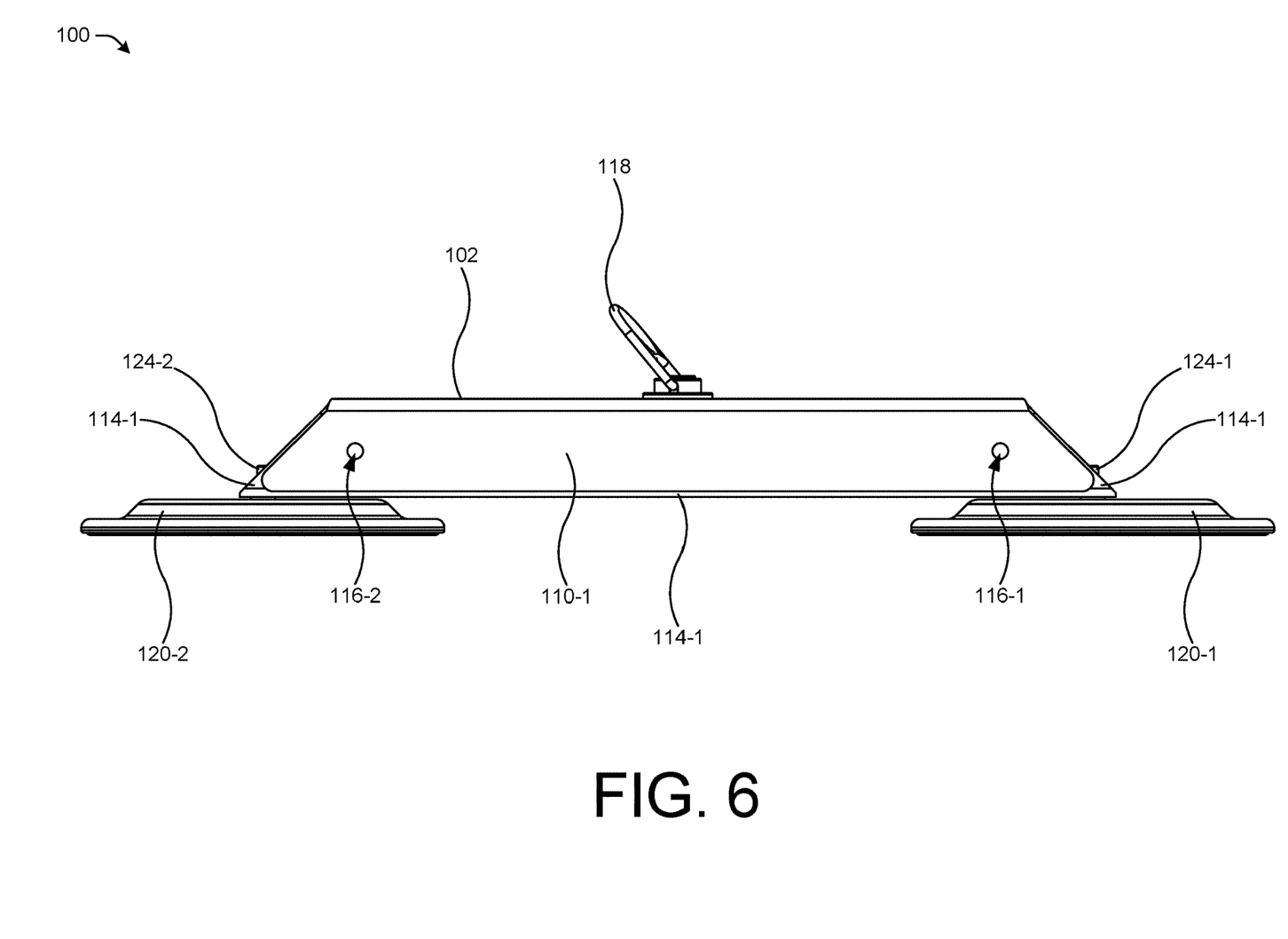
FIG. 6 illustrates a second side view of the top plate of the mounting device of FIG. 1, according to an example of the principles described herein.

In FIG. 1, the top plate 102 is depicted as being coupled to the first arm 114-1, and the second arm 114-2. FIG. 2 illustrates a bottom isometric view of the mounting device 100 of FIG. 1, according to an example of the principles described herein. Further, FIG. 3 illustrates a top plan view of the mounting device 100 of FIG. 1, according to an example of the principles described herein. FIG. 4 illustrates a bottom plan view of the mounting device 100 of FIG. 1, according to an example of the principles described herein. Further, FIG. 5 illustrates a first side view of the top plate 102 of the mounting device 100 of FIG. 1, according to an example of the principles described herein. FIG. 6 illustrates a second side view of the top plate 102 of the mounting device 100 of FIG. 1, according to an example of the principles described herein.

The top plate 102 may include a number of top plate apertures 106 defined therein. The top plate apertures 106 may serve a number of purposes including, for example, reducing an amount of material used to manufacture the mounting device 100. Further, the top plate apertures 106 may serve to allow for precipitation to drain from the surface of the center portion 104 of the top plate 102. In one example, the center portion 104 of the top plate 102 may be slightly concave around each of the top plate apertures 106 to allow for the precipitation to drain from the surface of the center portion 104 of the top plate 102. The top plate apertures 106 may have any shape, and, on one example, may include a triangular shape as depicted in the figures.

A number of side panels 110-1, 110-2 (collectively referred to as "side panel(s) 110") may extend from the center portion 104 of the top plate 102 and may be oriented at approximately a 90° angle with respect to the center portion 104 of the top plate 102. The side panels 110 may also be referred to as coupling panels as they are the elements through which the top plate 102 is coupled to the first arm 114-1 and the second arm 114-2. In this manner, the side panels 110 may interface with the first arm 114-1 and the second arm 114-2, respectively. In one example, the side panels 110 may be monolithically formed with the center portion 104 of the top plate 102 and formed at the 90° angle with respect to the center portion 104 of the top plate 102 through bending. In another example, the side panels 110 may be welded to or otherwise coupled to the center portion 104 of the top plate 102.

The side panels 110 may be coupled to a respective one of the first arm 114-1 and the second arm 114-2 via any means including, for example, through the use of a number of fastening devices or systems, welding, gluing, other fastening means, and combinations thereof. In the examples of FIGS. 1 through 6, a number of side panel apertures 116-1, 116-2, 116-3, 116-4 (collectively referred to as "side panel aperture(s) 116") may be defined within the side panels 110. Further, a number of arm apertures 112-1, 112-2, 112-3, 112-4, 112-5, 112-6, 112-7, 112-8 (collectively referred to as "arm aperture(s) 112") may be defined within the first arm 114-1 and the second arm 114-2, respectively. A fastener (not shown) may be inserted through a side panel aperture 116 and a corresponding pair of arm apertures 112 to couple the side panel 110 to the arm 114. The fasteners used to couple the side panels 110 to the arms 114 may include, for example, bolts and/or nuts, screws, nails, rivets, lynch pins, cotter pins, locking pins, clevis pins, other fasteners, and combinations thereof.

The top plate 102 may further include a number of end returns 108-1, 108-2 (collectively referred to as "end return(s) 108"). In one example, the end returns 108 may be monolithically formed with the center portion 104 of the top plate 102 and formed at the 90° angle with respect to the center portion 104 of the top plate 102 through bending. In another example, the end returns 108 may be welded to or otherwise coupled to the center portion 104 of the top plate 102. The end returns 108 strengthen the mounting device 100, eliminate the cutting hazard of the raw edge, enhance the appearance of the mounting device 100 and further assist to allow for precipitation to drain from the surface of the center portion 104 of the top plate 102. In one example, the end returns 108 may be dimensioned to fit between the first arm 114-1 and the second arm 114-2 and may be used to assist in alignment of the top plate 102 with the first arm 114-1 and the second arm 114-2. Stated another way, the first end return 108 may extend from the top plate 102 between the first coupling panel 110-1 on a first side of the top plate 102 and the second coupling panel 110-2 on a second side of the top plate 102. Similarly, a second end return 108-2 extends from the top plate between the first coupling panel 110-1 on a first side of the top plate 102 and the second coupling panel 110-2 on a second side of the top plate 102.

In one example, the top plate 102 including the center portion 104, the side panels 110, end returns 108, the first arm 114-1, and/or the second arm 114-2 may be coated to reduce or eliminate corrosion. In one example, the top plate 102 including the center portion 104, the side panels 110, end returns 108, the first arm 114-1, and/or the second arm 114-2 may be coated with neoprene (e.g., polychloroprene).

As depicted in FIGS. 1, 3, and 5, the first arm 114-1 and the second arm 114-2 include a hollow interior or channel 130. Thus, the first arm 114-1 and the second arm 114-2 includes a wall through which a number of apertures and features may be formed including the arm apertures 112 to allow the side panels 110 of the top plate 102 to be coupled to the first arm 114-1 and the second arm 114-2 via the fasteners described herein.

Further, a number of base apertures 128-1, 128-2, 128-3, 128-4 (collectively referred to as "base aperture(s) 128") may be defined in a bottom surface of the first arm 114-1 and the second arm 114-2. The wall formed by the channel 130 defined within the first arm 114-1 and the second arm 114-2 allows for the base apertures 128 to also be defined within a bottom wall of the first arm 114-1 and the second arm 114-2. As described in more detail herein, the base apertures 128 provide for the coupling of the first arm 114-1 and the second arm 114-2 to a surface of the structure to which the mounting device 100 is coupled either directly or indirectly via the base plates 120.

Having described both the first arm 114-1 and the second arm 114-2 as well as the top plate 102, the manner in which the top plate 102, the first arm 114-1, and the second arm 114-2 are coupled will now be described. The first arm 114-1 and the second arm 114-2 may be arranged parallel with respect to one another. In this arrangement, the first arm 114-1 and the second arm 114-2 may be moved either closer to one another or farther apart such that the first arm 114-1 and the second arm 114-2 abut an interior of the side panels 110 of the top plate 102. A number of fasteners (not shown) are caused to engage with the side panels 110 via the arm apertures 112 and the side panel apertures 116. With this engagement and coupling, the top plate 102 is coupled to the first arm 114-1 and the second arm 114-2 and, secures the first arm 114-1 and the second arm 114-2. Further, the tether fastener 126 may be caused to engage with the top plate 102 via the top plate aperture 202. Further, the anchor 118 may be coupled to the top plate 102 via the tether fastener 208.

Figure 7:
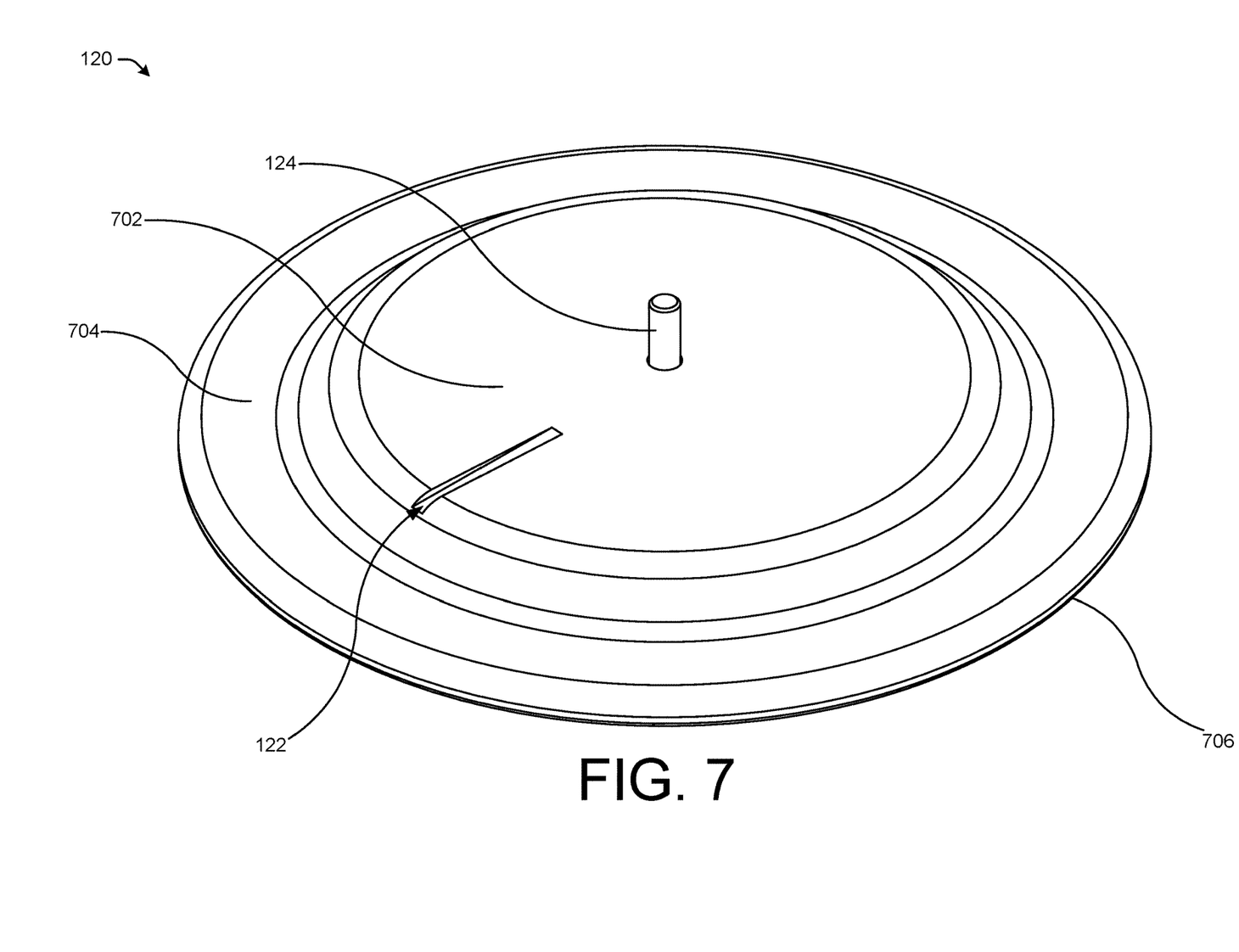
FIG. 7 illustrates a top isometric view of a base plate of the mounting device, according to an example of the principles described herein.
Figure 8:
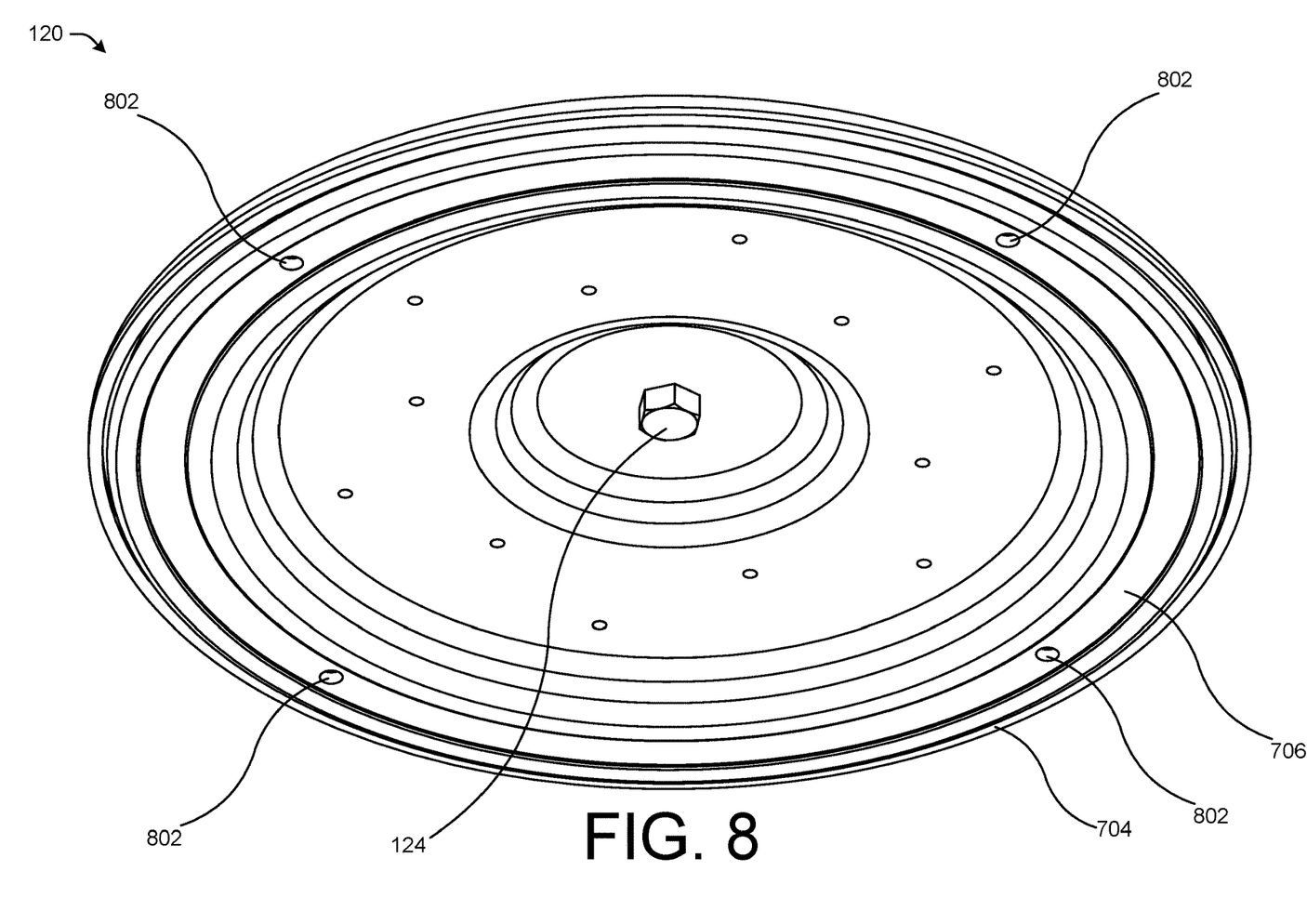
FIG. 8 illustrates a bottom isometric view of a base plate of the mounting device, according to an example of the principles described herein.

FIGS. 1 through 6 depict the first arm 114-1 and the second arm 114-2 interfacing with the top plate 102 of the mounting device 100 as well as the base plates 120 which will now be described in connection with FIGS. 7 and 8. FIG. 7 illustrates a top isometric view of a base plate 120 of the mounting device 100, according to an example of the principles described herein. FIG. 8 illustrates a bottom isometric view of a base plate 120 of the mounting device 100, according to an example of the principles described herein. Although in one example the mounting device 100 may be implemented without the inclusion of the base plate(s) 120, in one example, a number of base plates 120 may be included in order to ensure that the mounting device 100 and any fasteners used to couple the mounting device 100 do not come into contact with water such as through precipitation and become subject to oxidation, corrosion, etc.

The at least one base plate 120 includes a substrate 706 to couple the mounting device 100 to a structure via a number of structure fasteners (not shown). A coupling device 124 extends at a 90 degree angle relative to a surface of the substrate 706, a housing 704 acting as a first seal may be coupled to a top surface of the substrate 100. The housing 704 includes an aperture through which the coupling device 124 extends. The base plate 120 may also include a cap 702 acting as a second seal may be coupled to a bottom surface of the substrate. The housing 704 seals the seals the number of structure fasteners and the surface of the structure 706 and the cap 702 seals the coupling device 124.

The substrate 706 may be positioned below or under a number of layers of material such as, for example, a cap 702 and a housing 704. The substrate 706 may include a number of substrate fastener apertures 802 defined therein. Any number of substrate fastener apertures 802 may be defined in the substrate 706, a few of which are identified in FIG. 8. Further, the substrate fastener apertures 802 may be defined anywhere on the substrate 706. In one example, the substrate fastener apertures 802 may be located at any number of points along the substrate 706 irrespective of where a substructure under the surface of the structure such as a truss, joist, or similar substructure element is located. In one example, the structure fasteners (not shown) may be passed through the substrate fastener apertures 802 and into the surface of the structure. The structure fasteners may include screws, lag bolts, nails, or other types of fasteners.

As mentioned above, the substrate 706 may include a coupling device 124-1, 124-2, 124-3, 124-4 (collectively referred to as "coupling device(s) 124") such as a threaded bolt extending at a 90 degree angle relative to a surface of the substrate 706 as depicted in, for example, FIGS. 1 through 8. The coupling device 124 may enter the base apertures 128 defined in the bottom walls of the first arm 114-1 and the second arm 114-2. The coupling device 124, may include, for example, bolts and/or nuts, screws, nails, rivets, lynch pins, cotter pins, locking pins, clevis pins, other fasteners, and combinations thereof to secure the first arm 114-1 and the second arm 114-2 to the substrate 706 via the coupling device 124.

A housing 704 may be coupled to a top surface of the substrate 706. The housing 704 may include an aperture through which the coupling device 124 extends. The bottom of the housing 704 may be coupled to the top of the substrate 706 using, for example, an adhesive, a sealant, a waterproof sealant, or similar bonding agent to bond the bottom of the housing 704 to the top of the substrate 706. A cap 702 may be coupled to a top surface of the housing 704 using, for example, the adhesive, sealant, waterproof sealant, or similar bonding agent in a similar manner. Thus, the substrate 706 may be sealed by the housing 704 and/or the cap 702. The outer perimeter of the housing 704 that extends beyond the width of the substrate 706 may be sealed to the surface of the structure to which the base 120 is coupled. The cap 702 may seal the substrate 706 and/or the housing 706. Further, the cap 702 may seal the coupling device 124 to ensure that precipitation does not permeate around the coupling device 124 to the substrate 706. However, before sealing the substrate 706 below the housing 704 and the cap 702, the structure fasteners may be passed through the substrate fastener apertures 802 and into the surface of the structure.

The housing 704 may then be sealed to the surface of the structure using the adhesive, sealant, waterproof sealant, or similar bonding agent and the cap 702 may be sealed to the top surface of the housing 704. In this manner, the cap 702 and housing 704 seal the number of structure fasteners and the surface of the structure. This prevents water from precipitation from entering below the base plate 120 and corroding the structure fasteners or entering holes formed through the impingement of the structure fasteners into the surface of the structure.

In one example, the housing 704 and the cap 702 may be made of a polymer such as a plastic material or a rubber material. Further, the housing 704 and the cap 702 may be sealed from the environment through the use of a material that is waterproof and impervious to water. In one example, a drainage channel 122 may be defined in the cap 702. The drainage channel 122 may allow for precipitation to drain from the top of the cap 702 down the side and edge of the housing 704, and away from the base plate 120 and the mounting device 100.

CONCLUSION

The examples described herein provide a device, system, and method for securing an individual to a roof surface. The mounting device may be coupled to a roof surface anywhere with or without being coupled to understructures such as trusses, joists, etc. while still allowing for a secure device capable of being loaded at a standardized load such as, for example, 5,000 pounds.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative some examples that fall within the scope of the claims of the application.

What is claimed is:

1. A mounting device comprising:
   a first arm;
   a second arm positioned parallel to the first arm; and
   a top plate coupled to the first arm and the second arm, the top plate including:
      a center portion;
      a first coupling panel formed at a 90 degree angle with respect to a surface of the center portion; and
      a second coupling panel formed at a 90 degree angle with respect to the surface of the center portion, the second coupling panel being located at a side of the center portion opposite the first coupling panel;
   at least one base plate coupled to at least an end of the first arm or the second arm,
   wherein the at least one base plate includes:
      a substrate including a number of apertures to receive a number of respective structure fasteners to couple the mounting device to a structure via the number of fasteners.

2. The mounting device of claim 1, wherein:
   the first coupling panel couples to the first arm, and
   the second coupling panel couples to the second arm.

3. The mounting device of claim 2, wherein the top plate securing the first arm to the second arm via the first coupling panel and the second coupling panel.

4. The mounting device of claim 1, further comprising a tether fastener extending through a first aperture defined in the top plate.

5. The mounting device of claim 4, further comprising an anchor coupled to the tether fastener.

6. The mounting device of claim 1, further comprising:
   a first return extending from the top plate between the first coupling panel and the second coupling panel on a second side of the top plate; and
   a second return extending from the top plate between the first coupling panel and the second coupling panel on a third side of the top plate.

7. The mounting device of claim 1, further comprising a coupling device configured selectively to attach the substrate to, and detach the substrate from, the at least an end of the first arm or the second arm.

8. A mounting device comprising:
   a first arm;
   a second arm positioned parallel to the first arm; and
   a top plate coupled to the first arm and the second arm, the top plate including:
      a center portion;
      a first coupling panel formed at a 90 degree angle with respect to a surface of the center portion; and
      a second coupling panel formed at a 90 degree angle with respect to the surface of the center portion, the second coupling panel being located at a side of the center portion opposite the first coupling panel,
   a first base plate is coupled to a first end of the first arm,
   a second based plate is coupled to a second end of the first arm,
   a third based plate is coupled to the first end of the second arm, and
   a fourth based plate is coupled to the second end of the second arm.

9. A mounting device comprising:
   a first arm;
   a second arm positioned parallel to the first arm; and
   a top plate coupled to the first arm and the second arm, the top plate including:
      a center portion;
      a first coupling panel formed at a 90 degree angle with respect to a surface of the center portion; and
   a second coupling panel formed at a 90 degree angle with respect to the surface of the center portion, the second coupling panel being located at a side of the center portion opposite the first coupling panel,
   at least one base plate coupled to at least an end of the first arm or the second arm,
   wherein the at least one base plate includes:
   a substrate to couple the mounting device to a structure via a number of structure fasteners;
   a first seal coupled to a top surface of the substrate; and
   a second seal coupled to a bottom surface of the substrate
   wherein the first seal seals the number of structure fasteners and the surface of the structure.

10. The mounting device of claim 9, wherein:
    the first seal and the second seal are made of a polymer, and
    the first seal and the second seal are sealed from an environment.

11. The mounting device of claim 9, further comprising a coupling device extending at a 90 degree angle relative to a surface of the structure;
    the first seal including a first aperture through which the coupling device extends;
    the second seal including a second aperture defined in the second seal through which the coupling device extends, and
    wherein the second seal seals the coupling device.

* * * * *